United States Patent [19]

Miller

[11] Patent Number: 4,462,897
[45] Date of Patent: Jul. 31, 1984

[54] HYDROTREATMENT PROCESS

[75] Inventor: Jeffrey T. Miller, Naperville, Ill.

[73] Assignee: Standard Oil Company (Indiana), Chicago, Ill.

[21] Appl. No.: 467,952

[22] Filed: Feb. 18, 1983

Related U.S. Application Data

[63] Continuation-in-part of Ser. No. 231,757, Feb. 5, 1981, abandoned.

[51] Int. Cl.$^3$ .................. C10G 45/08; C10G 45/60
[52] U.S. Cl. .................. 208/254 H; 208/216 R
[58] Field of Search .................. 208/254 H, 216 R

[56] References Cited

U.S. PATENT DOCUMENTS

| | | | |
|---|---|---|---|
| 3,167,497 | 1/1965 | Solomon | 208/143 |
| 3,265,615 | 8/1966 | Buss | 208/254 H |
| 3,446,730 | 5/1969 | Kerns et al. | 208/254 H |
| 3,686,137 | 8/1972 | Gatti | 252/437 |
| 3,749,664 | 7/1973 | Mickelson | 208/254 H |
| 3,897,365 | 7/1975 | Feins et al. | 252/435 |
| 4,152,251 | 5/1979 | Mickelson | 208/254 H |
| 4,169,040 | 9/1979 | Bea et al. | 208/59 |
| 4,224,144 | 9/1980 | Hensley, Jr. et al. | 208/216 PP |
| 4,251,350 | 2/1981 | Johnson et al. | 208/216 R |
| 4,255,282 | 3/1981 | Simpson | 252/435 |
| 4,376,041 | 3/1983 | Richardson | 208/215 |

FOREIGN PATENT DOCUMENTS 1470512 2/1969 Fed. Rep. of Germany ... 208/254 H

*Primary Examiner*—Delbert E. Gantz
*Assistant Examiner*—O. Chaudhuri
*Attorney, Agent, or Firm*—James R. Henes; William T. McClain; William H. Magidson

[57] ABSTRACT

A process for hydrotreating a whole shale oil or a shale oil fraction containing at least about 0.1 wt. % nitrogen comprises a catalyst comprising a chromium component, a molybdenum component, a phosphorus component, and at least one of a cobalt component and a nickel component, deposed on a support comprisng at least one porous refractory inorganic oxide. Hydrotreatment comprises contacting a hydrocarbon stream, e.g., a whole shale oil. with hydrogen in the presence of the invented catalyst under hydrotreatment conditions.

4 Claims, No Drawings

HYDROTREATMENT PROCESS

RELATED CASE

This application is a continuation-in-part of my application Ser. No. 231,757, filed Feb. 5, 1981, abandoned.

BACKGROUND OF THE INVENTION

This invention relates to catalytic hydrotreatment of a hydrocarbon feed comprising a whole shale oil or a shale oil fraction containing at least about 0.1 wt.% nitrogen.

In recent years increased concern over world crude oil supplies has focused considerable attention on converting low quality hydrocarbons to more useful products. Due to the relatively high levels of sulfur, nitrogen, and metals typically contained in such low quality hydrocarbons, hydrotreatment typically is required to upgrade such materials and thereby facilitate conversion to more valuable products.

Catalysts for hydrotreatment of hydrocarbon feeds are well known and, in general, comprise a hydrogenating component, typically a Group VI and/or VIII metal, metal oxide, and/or metal sulfide deposed on a support comprising a porous refractory inorganic oxide. Examples of useful commercial hydrotreating catalysts include cobalt-molybdenum deposed on silica, alumina, or silica-alumina, and nickel-molybdenum deposed on silica, alumina, or silica-alumina.

Incorporation of phosphorus into the hydrogenating component of various hydrotreatment catalysts has been proposed in the past. For example, Bertolacini et al., "Catalyst Development for Coal Liquefaction," Electric Power Research Institute Report AF-574, November, 1977, pp. 2-26 to 2-34, 3-23 to 3-27, Appendix B-1 to B-3 and Appendix C-3 to C-4, discuss on pp. 3-24 to 3-27 the use of phosphoric acid as an impregnation aid for the impregnation of metals on catalyst. On pp. 3-25 and 3-27, the discussion involves comparison of data for catalysts containing cobalt and molybdenum components deposited on an alumina support and for catalysts containing a phosphorus component as well as the cobalt and molybdenum components deposited on an alumina support. This discussion concludes on p. 3-27 with the following statement: "No advantage in desulfuriziation of a residual oil and other product qualities was found for the catalysts containing phosphorus." Furthermore, the report states on p. 3-29, with regard to the effect of phosphoric acid on the impregnation of both high and low surface area aluminas, that there appears to be no significant effect on product nitrogen content for either high or low surface area aluminas as a result of the use of phosphoric acid.

Recently, U.S. Pat. No. 4,224,144 (Hensley et al.) has disclosed hydrotreatment of shale oil and similar feeds using catalysts comprising a chromium component, a molybdenum component, and at least one Group VIII metal component deposed on a porous refractory inorganic oxide support. Such catalysts are prepared by sequential or single-step impregnation of a support with compounds of the metals and calcination of the result. Column 4, lines 37-59. According to the patentee, such catalysts exhibit improved denitrogenation and desulfurization activity as well as improved maintenance of such activity as compared to typical, commercial cobalt-molybdenum catalysts.

Despite the favorable results attained in accordance with Hensley et al., it can be appreciated that further improvements would be desirable, particularly in view of the decreasing supply of high quality feeds and attendant emphasis on maximizing yields of useful products from lower quality feeds. It is therefore an object of this invention to provide an improved process for denitrogenation of feeds containing relatively high levels of nitrogen. Other objects of the invention will be apparent to persons skilled in the art from the following description and the appended claims.

In contrast to the results disclosed in Hensley et al., Bertolacini et al. in the aforesaid EPRI Report AF-574, reported that the comparison in coal liquefaction studies of the use of a catalyst having cobalt, molybdenum, chromium and phosphorus components on an alumina support to the use of a catalyst having only cobalt, molybdenum and phosphorus components on an alumina support indicated only small improvements in desulfurization and denitrogenation as a result of the chromium component. The discussion of the benefits of the presence of chromia concludes on p. 2-34 of the EPRI Report with the following statement: "However, the differences relative to the chromia-free catalysts are of questionable significance." Thus, the benefits due to the presence of chromia in a catalyst containing cobalt, molybdenum and chromium components on alumina reported by Hensley et al. were not observed in the coal liquefaction studies of Bertolacini et al. when the catalyst additionally contained a phosphorus-containing component on the alumina.

Surprisingly, I have now found that the objects of this invention can be attained by incorporation of an effective amount of a phosphorus component into the hydrogenating component of hydrotreatment catalysts comprising a chromium component, a molybdenum component and at least one of a cobalt component and a nickel component, deposed on a support comprising at least one porous refractory inorganic oxide. Surprisingly, incorporation of a phosphorus component into the hydrogenating component according to this invention results in substantial improvements in denitrogenation performance as compared to catalysts that are similar but for incorporation of the phosphorus component. It also is surprising that the phosphorus component content can be adjusted to emphasize either denitrogenation activity or hydrogen consumption in that at relatively low concentration levels of the phosphorus component, unexpectedly high denitrogenation activity is attained at typical hydrogen consumption rates, whereas higher concentration levels of phosphorus component may give somewhat lower denitrogenation activity but with unexpectedly low hydrogen consumption. In addition, desulfurization activity of the invented catalysts is at least comparable to that of known catalysts containing a chromium component, a molybdenum component and at least one of a cobalt component and a nickel component.

Other proposals that may be of interest with respect to the present invention include those directed to improving the hydrotreatment performance of catalysts such as those of the aforesaid Hensley et al. patent, containing a hydrogenating component comprising a chromium component, a molybdenum component and at least one Group VIII metal component. Thus, workers in our laboratories have found that denitrogenation activity of catalysts containing such a hydrogenating component can be promoted by supporting the component on a silica-alumina containing about 10 to about 50 weight percent silica. It also has been found that catalysts comprising a porous refractory inorganic oxide, a crystalline molecular sieve zeolite and the aforesaid hydrogenating component exhibits improved denitrogenation and cracking activity. In both cases, improved denitrogenation activity has been attributed in part to increased acidity of the catalysts as compared to those of Hensley et al., although attempts by me and my co-workers to improve hydrotreatment performance by increasing acidity of catalysts containing a similar hydrogenating component through inclusion of other refractory inorganic oxides have proved unsuccessful. While not wishing to be bound by any particular theory or mechanism, it can be theorized that incorporation of phosphorus into the hyrogenating component of the invented catalysts serves to increase acidity and thereby promote denitrogenation activity. Even if that is the case, however, the use of silica-alumina supports or combinations of porous refractory inorganic oxides in combination with molecular sieve zeolites to increase acidity does not suggest incorporation of a phosphorus component into a hydrogenating component according to the present invention.

DESCRIPTION OF THE INVENTION

Briefly, the catalyst employed in the method of this invention comprises a hydrogenating component comprising a phosphorus component, a chromium component, a molybdenum component and at least one of a cobalt component and a nickel component deposed on a support comprising at least one porous refractory inorganic oxide. The metal components can be present in elemental form, as oxides or sulfides, or as combinations thereof.

The hydrogenating component contains a phosphorus component which is present in a form effective to improve denitrogenation performance of the invented catalyst as compared to catalysts containing a similar hydrogenating component but for the inclusion of phosphorus. While not wishing to be bound by any particular theory, it appears that phosphorus may be present in the form of one or more oxides, compounds of the metals of the hydrogenating component and/or polymeric species containing recurring phosphorus-oxygen units and/or phosphorus-oxygen-metal groups.

The support on which the aforesaid hydrogenating component is deposed comprises at least one porous refractory inorganic oxide, specific examples of which include silica, alumina, silica-alumina, zirconia, titania, magnesia, boria and the like. Of course, combinations of metal oxides also are contemplated. Modified porous refractory inorganic oxides such as fluorided aluminas, chlorided silica-alumina and phosphated aluminas also are contemplated.

Presently preferred catalysts according to the present invention comprise about 5 to about 50 weight percent hydrogenating component and about 50 to about 95 weight percent support. In greater detail, chromium content preferably ranges from about 1 to about 30 weight percent calculated as $Cr_2O_3$, with about 5 to about 12 weight percent being more preferred from the standpoint of hydrotreatment performance. Content of the molybdenum component, calculated as hexavalent $MoO_3$, preferably ranges from about 1 to about 20 weight percent with about 7 to about 18 weight percent being more preferred from the standpoint of hydrotreatment performance. The total cobalt and nickel component content, calculated as CoO and NiO, respectively, preferably ranges from about 0.1 to about 7 weight percent with about 0.5 to about 5 weight percent being more preferred in terms of hydrotreatment performance. Higher levels of metals can be employed if desired though the degree of improvement resulting therefrom typically is insufficient to justify the added cost of the metals. Phosphorus component is present in an amount effective to improve denitrogenation activity and preferably ranges from about 1 to about 15 weight percent calculated as $P_2O_5$. Concentrations in the lower portion of this range, and especially about 1 to about 6 wt% calculated as $P_2O_5$, give maximum denitrogenation activity while concentrations in the upper portion of the range, and especially about 7 to about 12 wt% calculated as $P_2O_5$, give best results in terms of minimizing hydrogen consumption for a given degree of denitrogenation. It is to be understood that the weight percentages set forth herein are based upon total catalyst weight after final calcination.

The catalysts employed in the method of this invention comprise a composition obtained by a single-step or multi-step impregnation of a support comprising at least one porous refractory inorganic oxide with a solution or solutions of at least one chromium compound convertible to an oxide on calcination, at least one molybdenum compound convertible to an oxide on calcination, at least one compound of at least one of cobalt and nickel convertible to an oxide on calcination and at least one phosphorus compound convertible to an oxide or oxyacid on calcination, followed by calcining the impregnated support. For purposes hereof, single-step impregnation is defined as an impregnation in which a support is contacted with a single solution containing the aforesaid chromium, molybdenum, cobalt, nickel and phosphorus compounds. Multi-step impregnation is defined as an impregnation involving sequential contacting of support with a solution of at least one but less than all of the aforesaid compounds followed by contacting the so-impregnated support with one or more additional solutions containing one or more of the components until all of the hydrogenating components have been incorporated.

The mechanics of impregnating a support with solutions of compounds convertible to metal oxides on calcination are well known to persons skilled in the art and generally involve forming solutions of appropriate compounds in suitable solvents, preferably water, and contacting a support with an amount or amounts of solution or solutions sufficient to fill the pores of the support. Useful compounds convertible to oxides of chromium, molybdenum, cobalt and nickel also are well known to persons skilled in the art. Specific examples include ammonium chromate, ammonium dichromate, chromium(III) nitrate, chromium acetate, ammonium molybdate, ammonium paramolybdate, molybdic anhydride, cobalt nitrate, cobalt carbonyl, cobalt acetate, nickel nitrate and nickel acetate. Further details with respect to impregnation techniques are found in the examples appearing hereinbelow.

Phosphorus-containing compounds useful in preparation of the invented catalysts are those convertible to an oxide or oxyacid on calcination, such as phosphoric acid, phosphorous acid, hypophosphorous acid and pyrophosphoric acid. Esters of such acids also can be used although their cost and toxicity are disadvantageous. Phosphorus oxides such as $P_2O_5$ and $P_4O_6$ also can be used. Salts of the aforesaid acids and esters also are contemplated. Specific examples of these include ammonium phosphate, diammonium hydrogen phosphate and ammonium dihydrogen phosphate. Such phosphorus compounds are employed in the form of a solution in a suitable solvent such as water or the compounds can simply be added to a solution or solutions containing one or more compounds of the metals of the hydrogenating component. Phosphorus compound concentrations vary depending on solubility, amount of phosphorus component desired in the ultimate catalyst and amount of solution that can be accommodated by the particular support to be used as can be appreciated by persons skilled in the art.

As indicated hereinabove, a wide range of supports are suitable for impregnation according to this invention. The support should be calcined prior to the impregnation step or steps in which phosphorus compound is present as hydroxyl groups or the support may react with the phosphorus compound and thereby hinder incorporation of sufficient phosphorus component into the hydrogenating component. The support can be used in any suitable form, for example, as extrudate or powder. From the standpoint of hydrotreatment performance, presently preferred supports are aluminas and silica-aluminas containing up to about 50 wt% silica. More preferably, the support is an alumina or a silica-alumina containing up to about 50 wt% silica having a BET surface area of at least about 100 m$^2$/g and a pore volume of about 0.3 to about 1.0 cc/g as determined by nitrogen adsorption.

Following impregnation of support with compounds of the metals and phosphorus, the resulting impregnation product is calcined. If a multi-step impregnation is employed, it is desirable to dry and/or calcine the impregnation product after all intermediate contacting steps. Calcination preferably is conducted at temperatures of at least about 800° F. (about 425° C.) and more preferably at least about 1,000° F. (about 535° C.) for a period of at least about ½ hour. The calcination is conducted in the presence of a gas containing molecular oxygen, air being preferred from the standpoint of convenience and cost. While not required, it is desirable to dry the impregnation product at a temperature high enough to drive off excess solvent from the impregnation step prior to calcination. When water is used as the solvent in impregnation, preferred temperatures are at least about 250° F. (about 120° C.). Drying times of at least about ½ hour are preferred.

Although not critical, the sequence in which the metal and phosphorus compounds are incorporated into the support is important from the standpoint of attaining optimum hydrotreatment performance. While not wishing to be bound by any particular theory or mechanism, it appears that the chromium component of the hydrogenating component serves to stabilize the invented catalysts. The molybdenum component and cobalt or nickel component appear to provide most of the hydrogenating activity while the phosphorus component is believed to enhance or promote hydrogenating activity. Catalysts that are employed in a preferred embodiment of the method of this invention are those wherein impregnation with chromium compound is conducted first and then impregnation with phosphorus compound is conducted either simultaneously with the impregnation of the molybdenum, cobalt and nickel compounds or in a final impregnation step subsequent to impregnation with compounds of the molybdenum, cobalt and nickel metals. Best results are attained with catalysts obtained either by (1) impregnation of support with a solution of at least one chromium compound followed by calcination of the resulting impregnation product, followed by impregnation of the result with a solution containing at least one compound of each of molybdenum and at least one of cobalt and nickel and at least one phosphorus compound, followed again by calcination of the resulting impregnation product; or (2) by impregnating the support with a solution containing at least one chromium compound, calcining the resulting impregnation product, impregnating the result with a solution of a molybdenum compound and at least one of a cobalt compound and a nickel compound, drying the resulting impregnation product, contacting the result with a solution containing at least one phosphorus compound and calcining the result.

A catalyst used in a preferred embodiment of the method of this invention comprises a hydrogenating component comprising a phosphorus component, a chromium component, a molybdenum component and a cobalt component deposed on an alumina support wherein metals and phosphorus content and physical properties are as follows:

Cr (as $Cr_2O_3$): about 5 to about 12 weight percent
Mo (as $MoO_3$): about 10 to about 18 weight percent
Co (as CoO): about 1 to about 4 weight percent
P (as $P_2O_5$): about 4 to about 10 weight percent
BET Surface Area: about 100 to about 250 m$^2$/g
Pore Volume: about 0.3 to about 0.7 cc/g Preferably, such a catalyst is prepared by impregnation of an alumina support having a surface area of at least about 200 m$^2$/g, a pore volume of at least about 0.4 cc/g with the majority of such pore volume being contained in pores having radii of about 20 to about 80 angstroms with an aqueous solution of ammonium dichromate in an amount effective to give a final catalyst containing the aforesaid level of chromium, removing excess solution from the impregnation product, calcining the result at about 800° to about 1200° F. (about 425° to about 650° C.) for about ½ to about 20 hours, impregnating the result with a solution of ammonium molybdate and cobalt nitrate containing sufficient cobalt and molybdenum to give a final catalyst containing the aforesaid amounts, drying the resulting impregnation product at a temperature and for a time sufficient to remove excess liquid, impregnating with an appropriate amount of phosphoric acid and then calcining at about 800° to about 1200° F. (about 425° to about 650° C.) for about ½ to about 20 hours.

Prior to use of the aforesaid catalysts in the method of this invention, a sulfiding pretreatment is conducted in order to sulfide and partially reduce the metals of the hydrogenating component. It is important to avoid reduction of metals to the elemental form, however, because the elemental metals are less active.

A sulfiding pretreatment that is preferred from the standpoint of convenience comprises heating the catalyst to 250° to about 350° F. (about 120° to about 180° C.), contacting the catalyst with a flowing gaseous mixture of hydrogen sulfide and hydrogen at variable pressure for about ½ to about 2 hours, raising the temperature to about 350° to about 450° F. (about 175° to about 235° C.) with continued flow of the gaseous mixture for an additional ½ to about 2 hours, raising the temperature to about 650° to about 750° F. (about 340° to about 400° C.), and contacting with additional hydrogen-hydrogen sulfide gas mixture for an additional period of time, preferably about ½ to about 2 hours. The gas should be employed in an amount effective to provide at least about 110 percent of the stoichiometric amount of hydrogen sulfide needed to sulfide the metals of the hydrogenating component. The concentration of hydrogen sulfide in the gaseous mixture is not critical.

Preferably, the aforesaid sulfiding pretreatment is conducted while the catalyst is disposed in a hydrotreatment reaction zone because after the final pretreatment temperature is reached, the flow of hydrogen sulfide can be discontinued and hydrogen partial pressure increased to that to be used for the hydrotreatment process. Once operating pressure is achieved, hydrocarbon feed is simply introduced into the reaction zone.

While the above-described sulfiding pretreatment technique is preferred from the standpoint of convenience, other methods can be employed. For example, carbon disulfide can be added to a zone containing the catalyst, or a light hydrocarbon oil containing sulfur can be passed over the catalyst for a time sufficient to convert the metal components of the hydrogenating component to sulfides.

Hydrotreatment according to the present invention can be conducted in either fixed bed or ebullated bed manner. Preferred catalysts for use in fixed bed processes are those having an average particle size of about 1/32 to about ⅛ inches effective diameter. Pellets, spheres, and/or extrudate are contemplated for fixed bed use. In addition, more exotic shapes such as clover leaf, cross-shaped or C-shaped catalyst are contemplated. Preferred catalysts for ebullated bed use are those having diameters of about 1/32 to about 1/16 inch.

Hydrocarbon feeds to be hydrotreated according to this invention are hydrocarbon streams derived from oil shale containing at least about 0.1 wt% nitrogen, such as a whole shale oil or a fraction thereof.

Best results in the removal of sulfur and nitrogen from whole shale oil are obtained under conditions of about 1,000 psi to about 2,000 psi (6.9–13.8 MPa) hydrogen partial pressure and average catalyst bed temperatures within the range of about 700° to about 820° F. (317° to 438° C.) at an LHSV of about 0.1–8 volumes of hydrocarbon per hour per volume of catalyst and a hydrogen recycle rate or hydrogen addition rate within the range of about 1000 SCFB to about 10000 SCFB (about 178 to about 1780 m³/m³).

The following examples are intended to illustrate the present invention without limiting the scope thereof.

GENERAL EXPERIMENTAL PROCEDURE

The support used in all examples was a commercially available alumina (CATAPAL, a tradename of Continental Oil Company). The alumina was used in the form of 1/16 inch (about 0.16 cm) extrudate and had a surface area of 267 m²/g, pore volume of 0.568 cc/g, average pore diameter of 63.2 angstroms, all as determined by nitrogen desorption using a Digisorb 2500 instrument, and a 4 V/A average pole diameter of 85.1 angstroms. Prior to impregnation, the alumina was calcined at 1,000° F. (538° C.) in air for 16 hours in an oven. Following calcination the alumina was stored in a dessicator until use.

After completion of the catalyst preparations reported below, the catalysts were packed in a vertical stainless steel reaction tube having an inner diameter of 3/16-inch (0.47 cm) and containing a ⅛-inch (0.32 cm) outer diameter thermowell. Sulfiding pretreatment was conducted by raising the temperature of the catalyst bed to 300° F. (149° C.) and passing a mixture containing 8 percent hydrogen sulfide in hydrogen over the catalyst at variable pressure. After about one hour, the temperature was raised to about 400° F. (204° C.) and the gaseous mixture was passed over the catalyst for an additional hour. The temperature then was raised to 700° F. (371° C.) and the gaseous mixture was passed through the catalyst bed for one hour after which the gas flow was discontinued.

Following sulfiding pretreatment, hydrogen gas was introduced into the reactor and allowed to flow through the catalyst bed at a pressure of 1,800 psi (12.0 MPa) and flow rates specified in Tables I and II. A whole shale oil containing 1.27 wt.% nitrogen, 0.65 wt% sulfur and having an API gravity of 23.8° was fed to the reactor using a Ruska pump. Temperature of the catalyst bed was raised to 780° F. (416° C.). Effluent from the reaction tube was passed into a gas-liquid high-pressure separator in which gaseous effluent was separated from liquid. The gas was passed through a pressure control valve and a wet test meter to an appropriate vent. The liquid product was passed through a pressure control valve to a liquid product receiver which was sampled periodically.

Catalyst preparations are reported in Examples I–III and hydrotreatment results in Tables I–III.

EXAMPLE I

A control catalyst was prepared by adding 294 g alumina extrudate to a large glass vessel and adding thereto a solution prepared by dissolving 66.4 g $(NH_4)_2Cr_2O_7$ and 225 ml water and agitating gently for about ½ hour after which the mixture was allowed to stand for several hours. The resulting impregnation product then was dried in an oven at 250° F. (121° C.) for 1 hour after which the dried product was calcined at 1,000° F. (538° C.) for 16 hours in air. The result then was placed in a large glass vessel and a solution prepared by dissolving 73.6 g $(NH_4)_6Mo_7O_{24}.4H_2O$ and 23.4 g of $Co(NO_3)_2.6H_2O$ in 220 ml water was added thereto, the result was agitated for ½ hour and allowed to stand for 1 hour. Subsequently, the result was dried in an oven at 250° F. (121° C.) for one hour and then calcined in air at 1,000° F. (538° C.) for 1 hour.

Elemental analysis of the calcined catalyst showed a chromium content of about 10 weight percent calculated as $Cr_2O_3$, cobalt content of about 1.5 weight percent calculated as CoO, and molybdenum content of about 15 weight percent calculated as $MoO_3$. Nitrogen desorption of a sample of the catalyst using a Digisorb 2500 instrument showed a surface area of 166 m²/g, pore volume of 0.45 cc/g, and average pore radius of 108 angstroms.

EXAMPLE II

A catalyst according to the present invention was prepared by adding 79.0 g alumina to a large glass vessel, adding to the alumina a solution prepared by dissolving 20.35 g of $(NH_4)_2Cr_2O_7$ in 42 ml water, mixing the result for about ½ hour and then allowing the mixture to stand for 1 hour. The result then was dried at 250° F. (121° C.) for 1 hour after which it was calcined at 1,000° F. (538° C.) for 3 hours in air. The result then was placed in a large glass vessel and a solution prepared by dissolving 22.56 g $(NH_4)_6Mo_7O_{24}.4H_2O$, 7.17 g $Co(NO_3)_2.6H_2O$ and 9.0 g 80 percent phosphoric acid in 34 g water. The contents of the vessel were agitated gently for ½ hour and then allowed to stand for 1 hour. Subsequently, the result was dried at 1,000° F. (538° C.)

for 2.5 hours and then calcined at 1,000° F. (538° C.) for 16 hours in air.

Elemental analysis and Digisorb desorption of samples of the resulting catalyst showed a chromium content of 11 weight percent calculated as $Cr_2O_3$, molybdenum content of 15 weight percent calculated as $MoO_3$, cobalt content of 1.5 weight percent calculated as CoO and phosphorus content of 4.8 weight percent calculated as $P_2O_5$, surface area of 135 m$^2$/g, pore volume of 0.32 cc/g and average pore radius of 95 angstroms.

EXAMPLE III

Another catalyst according to the invention was prepared by impregnation of 79.0 g alumina with a solution of 20.35 g $(NH_4)_2Cr_2O_7$ in 70 ml water, drying the result in an oven at 250° F. (121° C.), calcining at 1000° F. (538° C.) in air for 2 hours, impregnating the result with a solution of 22.56 g $(NH_4)_6Mo_7O_{24}\cdot 4H_2O$ and 7.17 g $Co(NO_3)_2\cdot 6H_2O$ in 65 ml water, drying in an oven at 250° F. (121° C.) for 3 hours, impregnating the result with 18.0 g 85% phosphoric acid in 55 ml water, drying at 250° F. (121° C.) and calcining at 1000° F. (538° C.) in air for 2 hours. Elemental analysis of the resulting catalyst showed that it contained 8.2 wt% chromium, calculated as $Cr_2O_3$, 14.6 wt% molybdenum, calculated as $MoO_3$, 1.2 wt% cobalt calculated as CoO and 8.3 wt% phosphorus, calculated as $P_2O_5$.

TABLE I

Hydrotreatment Results With Catalyst I

| Days on Oil | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| LHSV | 0.51 | 0.51 | 0.51 | 0.51 | 0.51 | 0.51 | 0.51 | 0.64 | 0.64 | 0.64 | 0.64 | 0.64 | 0.64 | 0.64 |
| Liquid Product (g) | 93.1 | 208.7 | 212.9 | 203.1 | 209.7 | 216.4 | 209.2 | 263.6 | 276.5 | 274.0 | 251.2 | 266.0 | 268.2 | 267.1 |
| API Gravity (°) | 43.7 | 38.7 | 39.5 | 39.1 | 38.3 | 38.0 | 38.4 | 37.8 | 37.6 | 37.8 | 37.6 | 37.6 | 37.0 | 37.9 |
| Sulfur (ppm) | 141 | —* | 203 | — | 69 | — | 139 | — | 413 | — | 105 | — | 430 | 205 |
| Nitrogen (ppm) | 12 | — | 17 | — | 38 | — | 68 | — | 290 | — | 306 | — | 295 | 354 |
| $H_2$ Consumption (SCFB) | — | — | — | — | — | — | 1239 | — | — | — | — | — | — | 1205 |
| Pour Point (°F.) | — | — | — | — | — | — | 70 | — | — | — | — | — | — | 75 |
| Viscosity (CST) | — | — | — | — | — | — | 3.22 | — | — | — | — | — | — | 3.50 |

*Dashes indicate that property was not measured.

TABLE II

Hydrotreatment Results With Catalyst II

| Days on Oil | 1 | 2 | 3 | 4 | 5 | 6 | 7 | 8 | 9 | 10 | 11 | 12 | 13 |
|---|---|---|---|---|---|---|---|---|---|---|---|---|---|
| LHSV | 0.51 | 0.51 | 0.51 | 0.51 | 0.51 | 0.51 | 0.51 | 0.64 | 0.64 | 0.64 | 0.64 | 0.64 | 0.64 |
| Liquid Product (g) | 91.4 | 217.4 | 204.2 | 224.9 | 235.3 | 188.0 | 200.0 | 128.5 | 255.0 | 274.5 | 261.0 | 315.0 | 225.0 |
| API Gravity (°) | 40.8 | 39.3 | 39.5 | 40.3 | 39.5 | 40.2 | 40.1 | 38.5 | 39.2 | 38.8 | 38.5 | 38.5 | 39.3 |
| Sulfur (ppm) | 96 | —* | 460 | — | 43 | — | 268 | — | 174 | — | 61 | — | 72 |
| Nitrogen (ppm) | 87 | — | 2.1 | — | 1.5 | — | 2.6 | — | 16 | — | 17 | — | 13 |
| $H_2$ Consumption (SCFB) | — | — | — | — | — | — | 1375 | — | — | — | — | — | 1231 |
| Pour Point (°F.) | — | — | — | — | — | — | 75 | — | — | — | — | — | 65 |
| Viscosity (CST) | — | — | — | — | — | — | 3.15 | — | — | — | — | — | 3.22 |

*Dashes indicate that property was not measured.

It can be seen from the tables that denitrogenation activity improved as a result of incorporation of a phosphorus component into the hydrogenating component in Example II. Thus, on day 7, at 0.51 LHSV, Catalyst I gave a whole product containing 68 ppm nitrogen. This corresponds to 99.5% nitrogen removal. On day 7 of the run with Catalyst II, at 0.51 LHSV, nitrogen content was 2.6 ppm corresponding to 99.98% nitrogen removal. On day 14, after running at higher space velocity (0.64 LHSV), Catalyst I gave 354 ppm nitrogen in the product, corresponding to 97.2% nitrogen removal, whereas on day 14, again at 0.64 LHSV, Catalyst II gave 13 ppm nitrogen corresponding to 99.92% removal. This increase of about 2% with the invented catalyst translates to an increased activity of about 50% on a volume basis.

TABLE III

Hydrotreatment Results With Catalyst III

| Days on Oil | 1 | 2 | 3 | 4 | 5 | 6 | 7 |
|---|---|---|---|---|---|---|---|
| LHSV | 0.51 | 0.51 | 0.51 | 0.51 | 0.51 | 0.51 | 0.51 |
| Liquid Product (g) | 95.6 | 226.2 | 198.2 | 252.2 | 181.9 | 215.8 | 197.7 |
| API Gravity (°) | 42.5 | 40.1 | 39.7 | 39.4 | 38.7 | 38.1 | 38.9 |
| Sulfur (ppm) | 70 | 221 | 314 | 360 | 146 | 129 | 30 |
| Nitrogen (ppm) | 2.4 | 4.0 | 6.0 | 7.3 | 8.4 | 10.0 | 15 |
| $H_2$ Consumption (SCFB) | —* | — | — | — | — | — | 1141 |
| Pour Point (°F.) | — | — | — | — | — | — | 70 |

TABLE III-continued

| Days on Oil | Hydrotreatment Results With Catalyst III | | | | | | |
|---|---|---|---|---|---|---|---|
| | 1 | 2 | 3 | 4 | 5 | 6 | 7 |
| Viscosity (CST) | — | — | — | — | — | — | 3.33 |

*Dashes indicate that property was not measured.

Example III illustrates a catalyst containing sufficient phosphorus component to attain a desirably high level of denitrogenation at reduced hydrogen consumption. Thus, on day 7 of the run with Catalyst III, at 0.51 LHSV, nitrogen content was reduced to 15 ppm, corresponding to 99.998% removal; while hydrogen consumption was 1141 SCFB. In contrast, on day 7 at 0.51 LHSV, Catalyst I removed less nitrogen (99.5%) while requiring more hydrogen (1239 SCFB). Thus, improved denitrogenation was attained with the invented catalyst at a savings of about 8% hydrogen.

What is claimed is:

1. A process for hydrotreatment of a hydrocarbon feed wherein the hydrocarbon feed comprises a whole shale oil or a shale oil fraction and contains at least about 0.1 wt.% nitrogen, comprising contacting the hydrocarbon feed with hydrogen under hydrotreatment conditions in the presence of a catalyst comprising a phosphorus component, a chromium component, a molybdenum component and a cobalt component, deposed on a support comprising at least one porous refractory inorganic oxide.

2. The process of claim 1 wherein the support is an alumina or silica-alumina containing up to about 50 weight percent silica.

3. The process of claim 1 wherein the catalyst comprises from about 1 to about 15 weight percent phosphorus, calculated as $P_2O_5$, from about 1 to about 30 weight percent chromium, calculated as $Cr_2O_3$, from about 1 to about 20 weight percent molybdenum, calculated as $MoO_3$ and from about 0.1 to about 7 weight percent of cobalt, calculated as CoO, and deposed on a support comprising alumina or a silica-alumina containing up to about 50 wt.% silica.

4. The process of claim 1 wherein the hydrogen partial pressure is from about 1,000 psi to about 2,000 psi (6.9–13.8 MPa), the average reaction temperature of from about 700° F. to about 820° F. (317° to 438° C.), an LHSV of from about 0.1–8 volumes of hydrocarbon per hour per volume of catalyst, and a hydrogen recycle rate or addition rate of from about 1,000 SCFB to about 10,000 SCFB (178–1780 $m^3/m^3$).

* * * * *